(12) United States Patent
Rajnayak et al.

(10) Patent No.: US 11,514,354 B2
(45) Date of Patent: Nov. 29, 2022

(54) ARTIFICIAL INTELLIGENCE BASED PERFORMANCE PREDICTION SYSTEM

(71) Applicant: ACCENTURE GLOBAL SOLUTIONS LIMITED, Dublin (IE)

(72) Inventors: Mamta Aggarwal Rajnayak, New Delhi (IN); Charu Nahata, Bangalore (IN); Sorabh Kalra, Faridabad (IN); Harshila Srivastav, Noida (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1123 days.

(21) Appl. No.: 15/997,180

(22) Filed: Jun. 4, 2018

(65) Prior Publication Data

US 2019/0325354 A1  Oct. 24, 2019

(30) Foreign Application Priority Data

Apr. 20, 2018  (IN) ............................. 201811015053

(51) Int. Cl.
  *G06N 20/00*  (2019.01)
  *G06N 5/04*  (2006.01)

(52) U.S. Cl.
  CPC ............... *G06N 20/00* (2019.01); *G06N 5/04* (2013.01)

(58) Field of Classification Search
  CPC ............ G06N 20/00; G06N 5/04; G06N 3/08; G06N 7/005; G06K 9/6227; G06K 9/626; G06K 9/6269; G06K 9/627; G06K 9/6282
  See application file for complete search history.

(56) References Cited

U.S. PATENT DOCUMENTS

| | | | |
|---|---|---|---|
| 2013/0275135 A1* | 10/2013 | Morales | G10L 15/065 704/236 |
| 2015/0006294 A1* | 1/2015 | Irmak | G06Q 30/0269 705/14.66 |
| 2016/0071017 A1 | 3/2016 | Adjaoute | |
| 2016/0241579 A1* | 8/2016 | Roosenraad | H04L 63/1425 |
| 2017/0061329 A1* | 3/2017 | Kobayashi | G06N 20/00 |
| 2018/0054452 A1* | 2/2018 | Muddu | G06F 16/9024 |
| 2018/0240020 A1* | 8/2018 | Madaan | G06N 20/00 |

FOREIGN PATENT DOCUMENTS

CN  107609589 A  1/2018

* cited by examiner

*Primary Examiner* — Brent Johnston Hoover
(74) *Attorney, Agent, or Firm* — Mannava & Kang, P.C.

(57) ABSTRACT

An Artificial Intelligence (AI) based performance prediction system predicts the performance and behavior of an entity via a complex structure made of iterative and parallel machine learning (ML) model rebuilds with real time data collection. The engine selects a best model at every level and scores the entity to help in predicting the behavior of the entity. Model selection is based on various model selection criteria. The selected model determines a propensity score that indicates a likelihood of the entity migrating from a currently categorized segment to another segment of higher or lower value. Accordingly, messages or alerts with one or more of corrective actions or system enhancements can be transmitted based on the status of the entity via various targeting channels and a post treatment analysis is carried out to find the effect of the corrective actions on the entity. The feedback from the entity in response to the implemented corrective actions or system enhancements is collected for further training the AI based model.

17 Claims, 10 Drawing Sheets

ARTIFICIAL INTELLIGENCE BASED PERFORMANCE PREDICTION SYSTEM

CROSS REFERENCE TO RELATED APPLICATIONS

The present application claims priority under 35 U.S.C. 119(a)-(d) to Indian application number 201811015053, having a filing date of Apr. 20, 2018, the disclosure of which is hereby incorporated by reference in its entirety.

BACKGROUND

Modern day organizational environments are heavily dependent on computing and communication systems for execution of their tasks. An organization's workforce may be primarily interacting with its computing systems in carrying out its various duties. Protecting and maintaining the computing and communication systems is therefore, a fundamental task of the Information Technology (IT) sector. Regular monitoring and maintenance of an organization's computing and communication infrastructure enables extracting the maximum output from the organization's hardware and software resources, in addition to problem detection and prevention.

Solutions for monitoring the computing and communication infrastructure can include software-based applications and/or hardware-based monitoring tools. Such monitoring tools often times keep track of the system resources such as Central Processing Unit (CPU) usage, amount of free RAM, free space on various hard drives of the computing systems, computing hardware temperatures, networking information such as system Internet Protocol (IP) addresses, current rates of upload and download, system date and time, system uptime, information regarding the various users who may be logged in, fan speeds, voltages provided by the power supplies and the like. Monitoring systems may connect directly to the infrastructure to be monitored or the monitoring systems may be coupled to data collection systems connected to the systems being monitored. The data gathered by the monitoring systems can be displayed on device displays of the concerned personnel. Some monitoring systems may allow the concerned personnel to control the system being monitored such as by allowing temperature control and the like.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
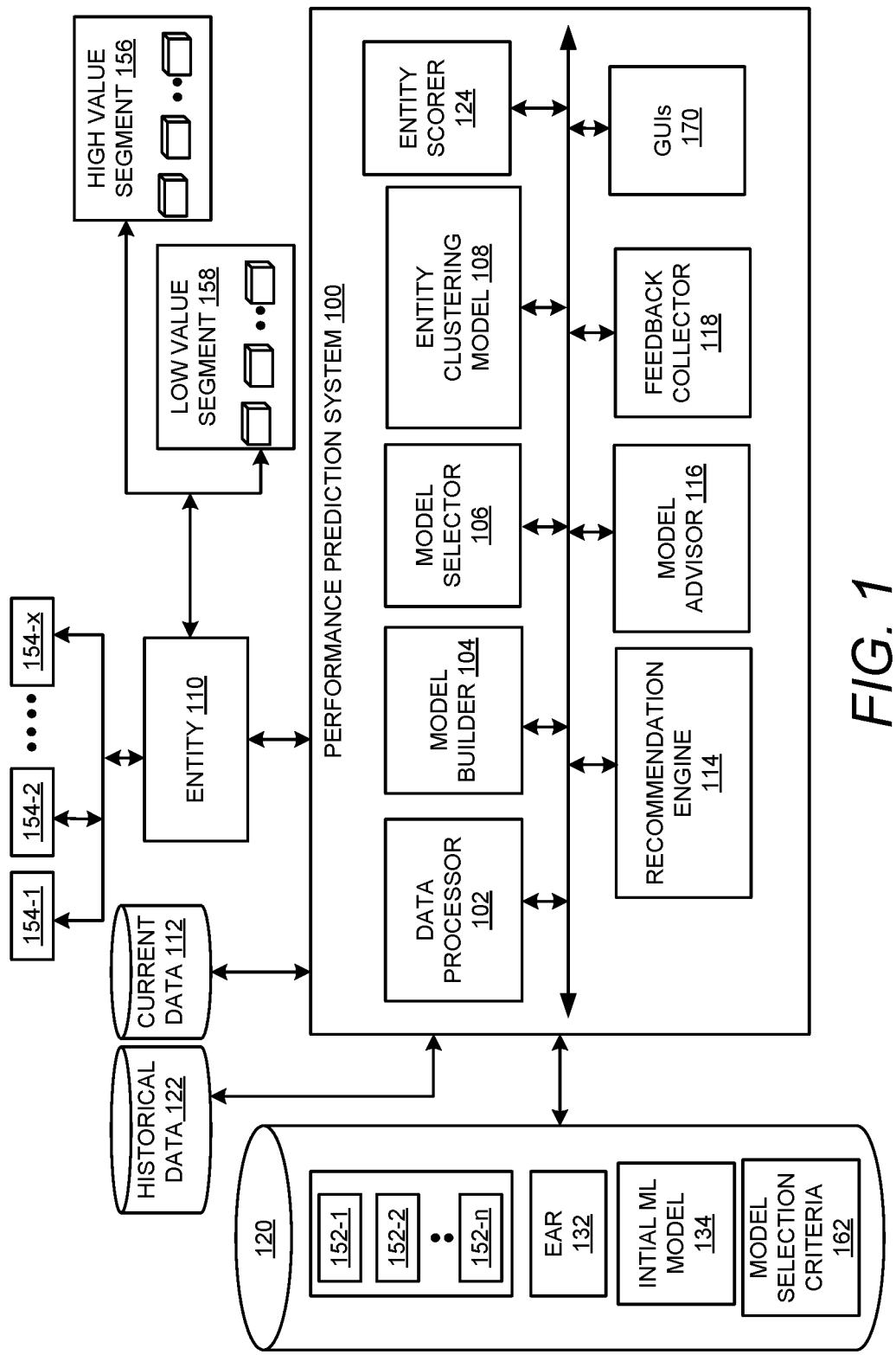
FIG. 1 is a block diagram that shows an Artificial Intelligence (AI) based performance prediction system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

The productivity of network devices in network systems, efficiency of machine spare parts in factory automation systems, reliability of security devices in network security systems can be constantly monitored to timely identify any drop in their performance. Such monitoring enables taking corrective actions to rectify the issues that may affect the systems. In essence, the productivity, efficiency, reliability and other attributes impute "value" or "worth" to the entities or parts or components that make up these systems. Disclosed herein is an artificial intelligence (AI)-based performance prediction system that builds models to predict a score to estimate an entity's future value from history. The disclosed performance prediction system can be applied to network systems, security systems, factory environments or other systems where determining particular entity value is of significance. The performance prediction system builds customized models through parallel processing which enables these models to be rebuilt/improvised automatically in real time with nil or minimal manual intervention, in order to continuously enhance score accuracy.

The performance prediction system, in some examples, periodically receives current data from condition detectors associated with an entity, selects a model that optimally suits the current data from one or more models which are each built by a respective model building methodology and employs the selected ML model to determine the status of the entity. The status determination or status prediction of the entity can include categorizing the entity into one of the multiple segments such as a high value segment or a low value segment and obtaining a propensity score for the entity. The propensity score of the entity can be indicative of the likelihood of the entity to migrate from the categorized segment into another segment. Based at least on the status of the entity, messages or alerts including any required corrective actions or system enhancements can be transmitted, or corrective actions or system enhancements can be implemented. The feedback from the entity with response of the entity towards any corrective actions or system enhancements that were implemented is recorded. The feedback thus recorded can be employed to further train the performance prediction system. The performance prediction system can be configured to monitor entities such as, but not limited to, machinery including hardware and software equipped with Internet of Things (IOT) sensors and/or software tools to detect associated conditions. An entity being monitored can be made up of component entities so that the status of the entity can be obtained by aggregating the statuses of the component entities.

Prior to periodically receiving the current data, the performance prediction system initially accesses historical data related to the entity. The historical data can include data received over time from the condition detectors and other entity attributes such as data from the IOT sensors, configurations, operating system versions, past breakdowns, the corrective actions and/or system enhancements that were implemented, the responses of the entity to the implemented actions, the industries served by the entity and the like. Various ML models can be simultaneously built from the historical data using respective model building methodologies which can include ML algorithms. The ML models thus built can be trained and tested using one or more of supervised learning or unsupervised learning to determine a propensity of the entity to migrate from one segment to another. The ML models are then compared and an optimal ML model can be selected for determining the status of the entity using certain model selection criteria. The model selection criteria can include receiver operating characteristics (ROC), lift and population gain and the like. In an example, the accuracies of the models based on the model selection criteria may be determined and the model with the highest accuracy can be selected for determining the migration propensity of the entity.

The selected ML model can receive information representing the current condition of the entity at a specified time period from the condition detectors as the current data for that time period. The current data can be indicative of the conditions at the entity including the functioning of the various parts or component entities of the entity. The selected ML model analyzes the current data to determine if the entity which is categorized within one of a high value segment or a low value segment possesses a tendency to migrate from the currently categorized segment to another segment. Entities can be categorized based on their past performance data and reliability. Therefore, entities with higher reliability or lower instances of breakdowns can be categorized under the high value segment while entities with lower reliability or records of frequent breakdowns can be categorized under the low value segment. It can be appreciated that the reliability of the entity can depend on various factors including the volume of work being handled by the entity as indicated in the current data. For example, if a server in a server farm can reliably cater to a specified volume of transactions it can be initially placed in the high value segment. However, if the volume of transactions increases gradually, it is likely that the server's reliability may decrease, in which case the server could transition, move or migrate from the high value segment to the low value segment. The server's tendency or likelihood to migrate from the high value segment to the low value segment can be proportional to the rate of increase in the transaction volume. Accordingly, the information from the condition detectors can indicate the propensity of the entity to migrate from a currently categorized segment to another segment. Therefore, a propensity score which can be indicative of the entity's tendency or propensity to migrate from the currently categorized segment to the other segment is estimated or calculated by the selected ML model.

Based at least on the status of the entity as indicated by the current categorization of the entity and the propensity score of the entity as estimated by the ML model, various alerts or messages can be transmitted by a recommendation engine included in the performance prediction system. The recommendation engine can include trained AI elements such as classifiers which can be trained to select corresponding actions from the historical data. Reverting to the server example discussed above, the recommendation engine can, based on training, either suggest a corrective action of reducing the transaction volume at the server or suggest a system enhancement whereby the server is reinforced with additional hardware to handle the increasing transaction volume. In case the variables are increasing rapidly, alerts regarding urgent actions to be implemented can be transmitted. In an example wherein the entity is categorized into the high value segment and the propensity score indicates little or no propensity of the entity to migrate, a message that the entity is stable and no action is required may be transmitted. In another example, if the entity is categorized into the low value segment and the propensity score indicates that the entity is likely to move into the high value segment, corrective actions and/or system enhancements may be identified to expedite the migration of the entity. The alerts or messages may be displayed via GUIs associated with the monitoring equipment executing the performance prediction system which can be collocated with the entity or which can be remotely located from the entity. In other examples, the messages or alerts can be transmitted to client devices such as smartphones, tablet devices, laptop or desktop computers of administrative personnel whose contact information has been provided to the performance prediction system.

A feedback collector can be included in the performance prediction system to record the various interactions of the performance prediction system including but not limited to received sets of the current data, the selected ML models, the categorizations and propensity scores of the entity for the various current data sets, the corrective actions and the system enhancements that were suggested by the performance prediction system, the corrective actions and the system enhancements that were actually implemented and the responses of the entity to the implemented actions. The data recorded by the feedback collector can be used as training data for the various AI elements within the performance prediction system. For example, the data related to the model selection for the various sets of the current data can be used to train a model selector within the performance prediction system. Similarly, the data recorded for the categorization and the propensity score estimation can be used to train an entity categorizer and the entity scorer within the performance prediction system. Data related to the corrective actions and the system enhancements that were suggested and eventually implemented and the response of the entity suggesting the success or failure of the implemented actions in achieving the targets can be used to train a recommendation engine. The performance prediction system is therefore configured to improvise and strengthen the AI elements carrying out the various entity monitoring tasks.

The AI-based performance prediction system as disclosed herein provides for various technical advantages over existing systems. Currently used standard modeling processes tend to be sequential in nature with implementation of one ML algorithm at a given time. A single model is built based on historical data which may be trained explicitly and/or implicitly using archived data. Such modelling systems which use a single model tend to be rather static and dependent on a single data load with no rebuild or recalibration with real-time data. As a result, the predictions provide by such static models may be inaccurate as the models do not adapt to changing situations represented in the real-time data. Technical improvements may occur in time wherein newer solutions may be identified for existing problems or improvements such as new hardware or new software tools or enhancements in networks/communication technologies can be introduced in the entities which the single, static model may not be configured to handle. On the other hand, using multiple ML model building algorithms in parallel enables a more dynamic AI-based performance prediction system that can quickly adapt to changes. For example, building various models in parallel enables initially selecting a best model from the historic data. Moreover, re-building the models or analyzing the various ML modeling algorithms for each data cycle when a newer set of the current data is received enables a more dynamic and adaptive environment. Each data cycle can test numerous models in parallel and provide the best model that suits a given current data set based on the model selection criteria. As a result, the final propensity scores are a combination of the best ML models. The parallel model build procedures combined with the real-time rebuilds and self-learning capabilities enable the performance prediction system to improve with usage while adapting to different situations in addition to enhancing prediction accuracies.

FIG. 1 is a block diagram that shows the performance prediction system 100 in accordance with examples disclosed herein. The performance prediction system 100 may be a computing system including a processor and a non-transitory data storage medium such as the data store 120 which may store data and instructions for executing processes associated with monitoring an entity 110. Entity performance prediction can include determining a value or worth to the entity 110 and detecting if the entity 110 is trending towards an increase or decrease in value based on real-time data or current data 112 obtained from various condition detectors 154-1, 154-2 . . . 154-x (x being a natural number) associated with the entity 110. The entity 110 being monitored can include large systems with numerous dynamic parts or the entity 110 can be a smaller part of the larger system. For example, the entity 110 can be one or more network devices in the network system or the network system itself. Similarly, the entity 110 can include without limitation, a sensor in a factory automation system or the entity 110 can be the factory automation system itself, or the entity 110 may be a computer system in a server farm or the entity 110 can be the server farm. The entity 110 may also encompass multiple server farms spanning an entire network. In another example, the entity 110 can be a camera device in a security system of a facility or the entity 110 may represent the security system itself. It can be therefore seen that the performance prediction system 100 is not limited a particular entity size. The value of the entity 110 can include one or more of entity attributes such as but not limited to productivity, reliability, efficiency or other entity-specific attribute that determines a performance level of the entity 110 in comparison to an expected performance level as specified, for example, in a user manual or other technical specification(s) associated with the entity 110.

The condition detectors 154-1, 154-2 . . . 154-x, in some examples, can be IOT sensors which detect environmental factors surrounding the entity 110 such as but not limited to, temperature sensors, moisture sensors, fan speed indicators and the like. Condition detectors 154-1, 154-2 . . . 154-x in some examples can also include software assessment tools such as widgets to test network speed, server load and the like. The condition detectors 154-1, 154-2 . . . 154-x can therefore be directly affixed to the entity 110 or may be remotely located from the entity 110. In an example, the performance prediction system 100 may include a database which receives and stores the current data 112 gathered from the condition detectors 154-1, 154-2 . . . 154-x.

Based on one or more of the current data 112 and other entity attributes, the performance prediction system 100 determines the value for the entity 110 thereby categorizing or clustering the entity 110 into one of the multiple segments which can include, for example, a high value segment 156 or a low value segment 158. The high value segment 156 includes entities that have a low breakdown frequency, or entities with greater reliability. On the other hand, entities which have high breakdown frequency or low reliability can be classified under the low value segment 158. In addition to classifying the entities into different segments, the performance prediction system 100 also detects the trend or the propensity of a given entity to move from an initially categorized segment to another segment. For example, the performance prediction system 100 can determine the likelihood of the entity 110 which is initially categorized within the high value segment 156 to move to the low value segment 158 or vice versa. The other entity attributes that determine value of the entity 110 can include without limitations, past breakdown behavior, cost of investment, entity profiles, purchase data, geo logs and the like. As an entity may include a number of component entities as described above, the value of an entity may be an aggregate of the values of each component entity as estimated by the performance prediction system 100 and the entity 110 is categorized into one of the segments based on the aggregate values of the various component entities.

The performance prediction system 100 determines the categorization and estimates the likelihood of migration from one segment to another via parallel model building based on historical data (using same or different algorithms) 122 and real-time model refreshment based on the current data 112. Accordingly, the performance prediction system 100 is configured to access various data sources such as but not limited to, historical data 122 which may include archives of various sensor logs collected over a period of time, the past breakdowns with the information regarding solutions that were implemented such as the success/failure of the solutions, the synergies that may have been detected between the sensor logs and the past breakdowns, the date ranges, location data, demographic data including administrative and other user profiles, network data, security data, visual data and the like. Various data storage formats such as distributed Big Data platforms, cloud service storage, data warehousing and the like may be used to store one or more of the historical data 122 and the current data 112.

A data processor 102 is included the performance prediction system 100 to access the various data types thereby enabling the parallel model building and the real-time model refreshment. The data processor 102 can include data interfaces for pulling, searching, feeding and/or streaming the data. The data processor 102 executes extensive data cleaning and treatment procedures on the received data thereby enabling proper formatting, data de-duplication, estimating any requisite calculated values from the raw data and the like to generate an entity analytical record (EAR) 132 which forms a consolidated dataset rolled up at a particular level. In an example, creation of EAR 132 can be facilitated by the data extraction, transformation and loading (ETL) processes on data storage units such as data marts and data warehouses. Cloud data providers such as Amazon Web Services (AWS) or AZURE can also be employed for the data processing. The EAR 132 provides a 360 degree view of the entity while enabling flexibility and scalability of various parameters to classify the entities into the high value segment 156 or the low value segment 158. In an example, the data processor 102 may be configured to pull data from the various data sources into the current data 112 periodically in order to estimate the status of the entity 110. In an example, the data sources may be configured to periodically push the current data 112 for the status assessment of the entity 110. The performance prediction system 100 employs an entity clustering model 108 built from the historical data 122 to initially classify the entity 110 into one of the segments 156 or 158. The tendency of the entity 110 to migrate from a segment (into which the entity 110 is categorized using the entity clustering model 108) to another is obtained by an initial ML model 134.

A model builder 104 included in the performance prediction system 100 builds different models 152-1, 152-2 . . . 152-n in parallel based on respective model building methodologies using the historical data 122. Various ML algorithms such as, but not limited to, random forest, SVMs, gradient boosting and the like may be employed in parallel to build a corresponding plurality of models 152-1, 152-2 . . . 152-n. The models 152-1, 152-2 . . . 152-n may be validated with testing data prior to selection. One of the models 152-1, 152-2 . . . 152-n can be selected as the initial ML model 134 which will be used to calculate a propensity score for the entity 110. As processing resources become more cost effective, building and testing different models in parallel provides the advantage of identifying a methodology that most optimally models the historical data 122.

It should be understood that while two segments (i.e., a high value segment 156 and a low value segment 158) are illustrated, more than two segments could be modeled with the disclosed performance prediction system, such that entity migration between individual segments in a group of segments can be predicted based on, e.g., a comparative value ordering of those segments (e.g., a high value segment, a medium value segment, and a low value segment). When more than two segments are available for categorizing or clustering the entity 110, multiple ML models can be used for the propensity score calculations based on the possible transitions of the entity 110 between the various segments. For example, if three segments 1, 2 and 3 are available for entity clustering, then nine possible propensity scores (including a possibility that the entity will not migrate and remains with a currently clustered segment) can be estimated for the entity 110. Generally, for n segments, $n^2$ propensity scores can be calculated for the entity 110 and a transition with the highest propensity score is selected as the most likely transition for the entity 110. For the determination that the entity 110 will remain classified in the current segment, the propensity scores may be compared with each other or a threshold in different examples so that the determination can be based on the comparisons.

A model selector 106 evaluates the models 152-1, 152-2 . . . 152-n to select a model as the initial ML model 134. Model selection criteria 162 that are useful for evaluating the quality of classification models used in data mining and ML are employed. Model selection criteria 162 may include but are not limited to, receiver operating characteristics (ROC), lift and population gain and the like. ROC is a statistical measure wherein the true positive rate (TPR) is plotted against the false positive rate (FPR) for various threshold settings. ROC analysis provides tools to select possibly optimal models and to discard suboptimal ones. Gain or lift is a measure of the effectiveness of a classification model calculated as the ratio between the results obtained with and without the model. Gain and lift charts serve as visual aids for evaluating performance of classification models. Each of the ROC, lift or population gain may be associated with respective thresholds. The numbers for each of the models 152-1, 152-2 . . . 152-n under each model selection criterion may be obtained and compared with respective thresholds in order to select a model to be used as the initial ML model 134.

An entity scorer 124 receives information regarding the model selected as the initial ML model 134 and employs the initial ML model 134 to obtain a propensity assessment of the entity 110 for at least a first data cycle. As the performance prediction system 100 is configured to periodically examine data associated with the entity 110, a first wave of data received in the first data cycle from the various data sources such as the condition detectors 154-1, 154-2 . . . 154-x which can be indicative of a current propensity of the entity 110 is analyzed by the initial ML model 134. As mentioned above, the entity 110 can be initially classified into one of the high value segment 156 or the low value segment 158 by the entity clustering model 108. In an example, the entity clustering model 108 can include Artificial Intelligence (AI) algorithms like hierarchical clustering, k-means clustering and the like to classify the entity 110. In addition, the entity scorer 124 calculates a propensity score as detailed further herein. The propensity score can indicate a likelihood that the entity 110 will migrate from a categorized segment to another segment. In an example, the entity clustering model 108 and the entity scorer 124 can be used each time a new data is received by the performance prediction system 100 so that the entity 110 is classified into one of the segments and the propensity score is estimated. In an example, the entity clustering model 108 can be configured to periodically classify the entity 110 into one of the segments. The entity clustering model 108 can cluster available entities periodically such as on daily, weekly, monthly etc. basis. Additionally, the entity scorer 124 can be engaged to estimate the propensity score for the entity 110 each time new data is received by the performance prediction system 100 based on the segment into which the entity 110 was last classified by the entity clustering model 108.

Based on the categorization of the entity 110 and the propensity score, various alerts or recommendations may be transmitted by the recommendation engine 114. For example, if the entity 110 is categorized within the high value segment 156 and the propensity score indicates that the entity 110 will remain within the high value segment 156, a message that the entity 110 is stable may be transmitted. If the entity 110 is categorized within the high value segment 156 and the propensity score indicates that the entity 110 is poised to migrate to the low value segment 158, alerts or messages regarding corrective actions as detailed herein may be transmitted to various administrative users. If the entity is categorized within the low value segment 158 and the propensity score indicates that there is no change in the status of the entity 110 and that it continues to have higher frequency of breakdowns, it can be indicative the prior corrective actions that may have been implemented to improve the status of the entity 110 are inadequate and that other corrective actions are needed. Messages or alerts to this end can be transmitted to the administrative users. If the entity is classified within the low value segment 158 and the propensity score is indicative of a potential migration of the entity 110 to the high value segment 156, it may be indicative that the corrective actions implemented to improve the status of the entity 110 are effective and further actions if any may be implemented to expedite the migration of the entity 110 from the low value segment 158 to the high value segment 156.

The performance prediction system 100 is configured to monitor the entity 110 continuously so that the current data 112 is maintained in an updated state. In an example, the current data 112 is updated in real-time with data from the condition detectors 154-1, 154-2 . . . 154-x. When a data update from the condition detectors 154-1, 154-2 . . . 154-x arrives at the current data 112 (after clean up by the data processor 102), the models 152-1, 152-2 . . . 152-n may be refreshed or re-built based on the current data 112. Therefore, each of the various model building techniques such as SVMs, random forests etc. that were used for generating the models 152-1, 152-2 . . . 152-n are again employed to process the current data 112. Each of the models thus rebuilt are again compared to each other and to the initial ML model 134 for accuracy using the model selection criteria 162. One of the models 152-1, 152-2 . . . 152-n is again selected for estimation of the propensity score of the entity 110. Based at least on the entity categorization and the propensity score, the recommendation engine 114 may send out alerts or messages to the responsible personnel. Thus, each time a data wave arrives at the performance prediction system 100, the models 152-1, 152-2 . . . 152-n can be rebuilt and the propensity score re-evaluated to determine the status or the condition of the entity 110 in terms of performance and stability.

As the performance prediction system 100 continues to monitor and control the entity 110 over time, the data collected during the processes may include information regarding which of the models 152-1, 152-2 . . . 152-n are optimally suited to respond to a given data set from the condition detectors 154-1, 154-2 . . . 154-x. A deep learning based model advisor 116 can be trained on such data to identify which of the models 152-1, 152-2 . . . 152-n is to be rebuilt in response to a given set of conditions outputted by the condition detectors 154-1, 154-2 . . . 154-x. Various learning methodologies such as supervised learning, unsupervised learning or semi-supervised learning may be implemented to train the model advisor 116 in selecting a model to be re-built. In an example, a model that was built in a prior data cycle may be selected as best suited to respond to a given set of conditions that is received in the current data cycle. The efficiency of the performance prediction system 100 is therefore improved and the processing power conserved since the model advisor 116 mitigates the need to refresh or rebuild all the models 152-1, 152-2 . . . 152-n for each data cycle.

The performance prediction system 100 also includes a feedback collector 118 which records the conditions received in the data cycles, the alerts or messages sent out in response to the conditions and the status achieved by the entity 110 upon implementation of the solutions suggested in the messages or alerts. In an example, the status achieved by the entity 110 in response to the implementation of a solution in a current data cycle may be determined based on the conditions received at the performance prediction system 100 from the various condition detectors 154-1, 154-2 . . . 154-x in the next data cycle. The performance prediction system 100 is thus configured not only for constant monitoring and control but also for continuous, automatic learning so that the monitoring and control functions improve with usage.

The performance prediction system 100 also includes various GUIs 170 to provide information stored in the EAR 132, alerts/messages that are transmitted or which are to be transmitted to the users, the potential issues that were identified based on the historic data 122 and/or the current data 112. The GUIs 170 may allow a user to obtain a high level summary view of the functioning of the entity 110 while simultaneously providing a drilled down view which can allow the user to explore the details of the components of the entity 110 which are monitored by the performance prediction system 100.

Figure 2:
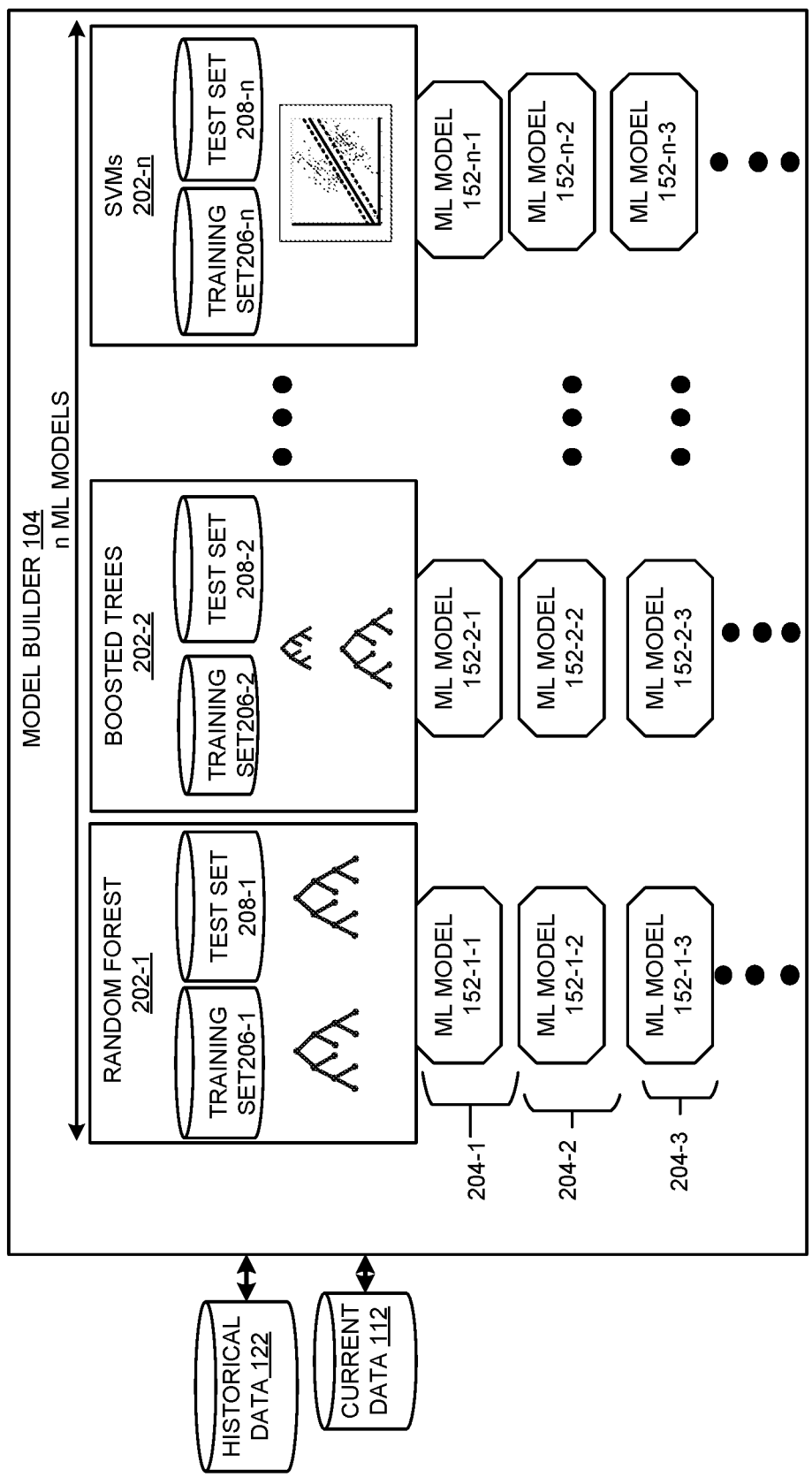
FIG. 2 shows a schematic diagram of a model builder in accordance with examples disclosed herein.

FIG. 2 shows a schematic figure of the model builder 104 in accordance with embodiments disclosed herein. The model builder 104 executes one or more ML-based model building algorithms 202-1, 202-2 . . . 202-n in parallel to obtain a respective model for each data cycles in order to enable the most optimal modeling for the current data 112 in each data cycle. Each of the respective models can correspond to a given ML-based model building algorithm such as, but not limited to, random forest 202-1, boosted trees 202-2, . . . and support vector machines 202-n. Various modeling layers 204-1, 204-2, 204-3 . . . can correspond to a respective data cycle when the current data 112 is refreshed with input from the condition detectors 154-1, 154-2 . . . 154-x. The initial set of models 152-1-1, 152-2-1 . . . 152-n-1 may be built from the historical data 122 and the initial ML model 134 can be selected from the initial or the first set of models 152-1-1, 152-2-1 . . . 152-n-1. During the first data cycle represented by the modeling layer 204-1, the initial ML model 134 analyzes the current data 112 received from the condition detectors 154-1 . . . 154-x to determine the status of the entity 110.

Subsequent second layer 204-2 corresponds to a data cycle when the current data 112 is again refreshed and a second set of models 152-1-2, 152-2-2, . . . 152-n-2 corresponding to each of the algorithms 202-1, 202-2 . . . 202-n are re-built based on a second set of the current data 112 and one of the models 152-1-2, 152-2-2, . . . 152-n-2 is selected for determining the status of the entity 110. Similarly, the third layer 204-3 corresponds to a third data cycle when the current data 112 is again refreshed and the third set of models 152-1-3, 152-2-3 . . . 152-n-3 are re-built for determining the status of the entity 110. Each of the models in a given layer are trained using a respective training data set 206-1, 206-2 . . . 206-n and tested using a respective test data set 208-1, 208-2 . . . 208-n. Thus, each time the current data 112 is refreshed in a data cycle, each of the 'n' ML models can be rebuilt. The monitoring cycle is thus continued with each of the succeeding layers corresponding to a respective data cycle. The time period for the data cycle may be set within the performance prediction system 100 so that the current data 112 is updated, for example, every hour, daily, weekly etc.

Figure 3A:
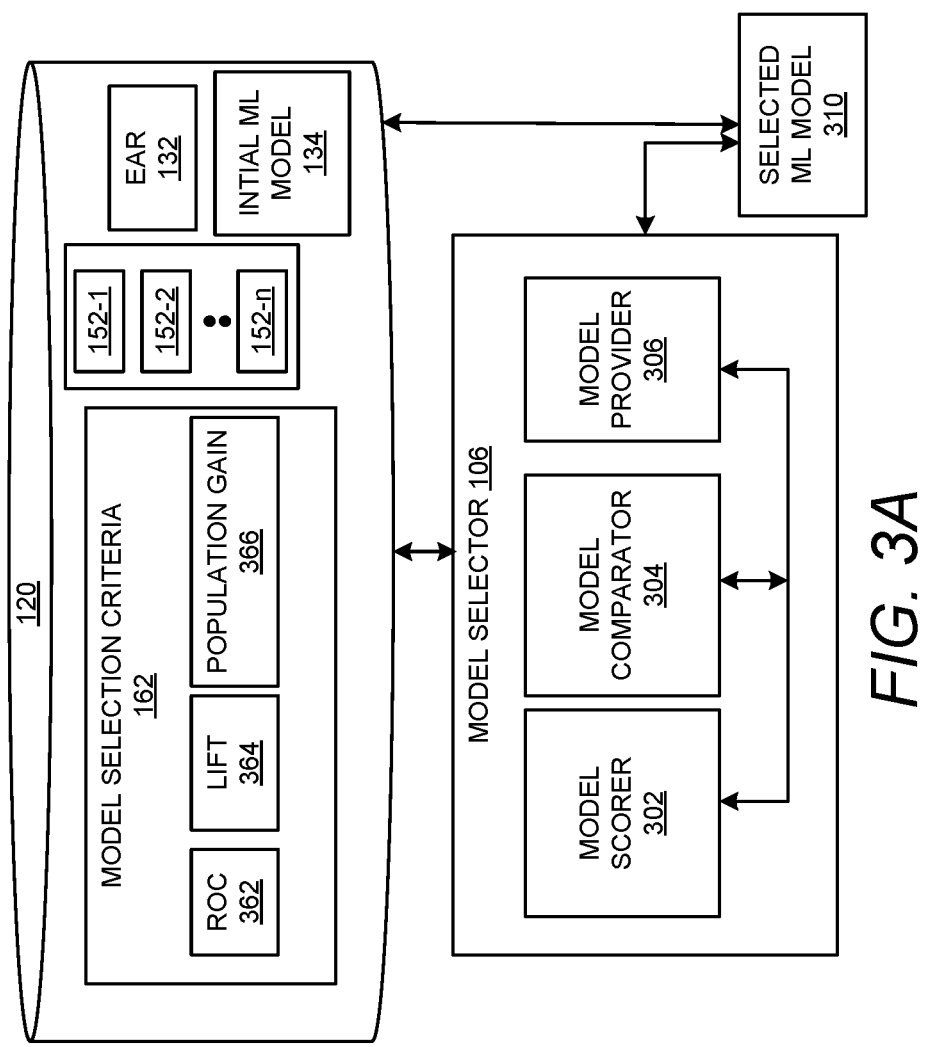
FIG. 3A shows a block diagram of a model selector in accordance with examples disclosed herein.

FIG. 3A is a block diagram of the model selector 106 in accordance with examples disclosed herein. The various models produced in parallel by the model builder 104 are evaluated by the model selector 106 which outputs an optimal model that is capable of determining the current status of the entity 110 and accurately predict the propensity of the entity 110 to migrate from a classified segment to another segment. ROC 362, lift 364 and population gain 366 are some non-limiting examples of the model selection criteria 162 that may be employed for selecting, for example, one of the models 152-1-1, 152-2-1 . . . 152-n-1.

A model scorer 302 scores each of the models 152-1-1, 152-2-1 . . . 152-*n*-1 based on the thresholds met by each model for each of the model selection criteria. The thresholds for the model selection criteria 162 can be set based on historical values. The thresholds may be hard coded or programmed into the model scorer 302. The model comparator 304 compares the various scores of the models to provide the best model for each of the layers 204-1, 204-2 . . . . For the first or initial layer 204-1, the initial ML model 134 may be identified as the best model from the initially generated models, 152-1-1, 152-2-1 . . . 152-*n*-1. In an example, the model comparator 304 may select a model based on accuracy so that a model fulfilling the condition below is selected:

$$\text{Accuracy}=\max(\text{model 152-1-1}, \text{model 152-2-1}, \ldots \text{model 152-}n\text{-1}) \quad \text{Eq. (1)}$$

Or $$\text{Accuracy}=\max(\text{model 152-}n\text{-1}, \text{weighted model average}) \text{ where} \quad \text{Eq. (2)}$$

$$\text{weighted model avg}=\text{avg}(y1+y2+\ldots yn) \quad \text{Eq. (3)}$$

and where y1, y2, y3 . . . may be the respective propensity scores obtained by each of the models 152-1-1, 152-2-1, . . . 152-*n*-1 for a given data cycle. Different propensity scores may provide different conclusions regarding the likelihood of the entity 110 to migrate from a selected segment to the other segment. For example, y1 and y2 may indicate that the entity 110 is likely to migrate while y3 may indicate that the entity 110 is less likely to migrate. A model provider 306 outputs the selected ML model 310 (which may be the initial ML model 134 during the first data cycle) for obtaining status information regarding the entity 110.

The model builder 104 and the model selector 106 work in synchrony to execute the parallel model building or real-time model re-build processes. However, as the performance prediction system 100 continues to build and re-build models for various data values from the condition detectors 154-1, . . . 154-*x* for different sets of circumstances/conditions, the knowledge regarding which of the models work best for a given set of conditions may accumulate over time.

Figure 3B:
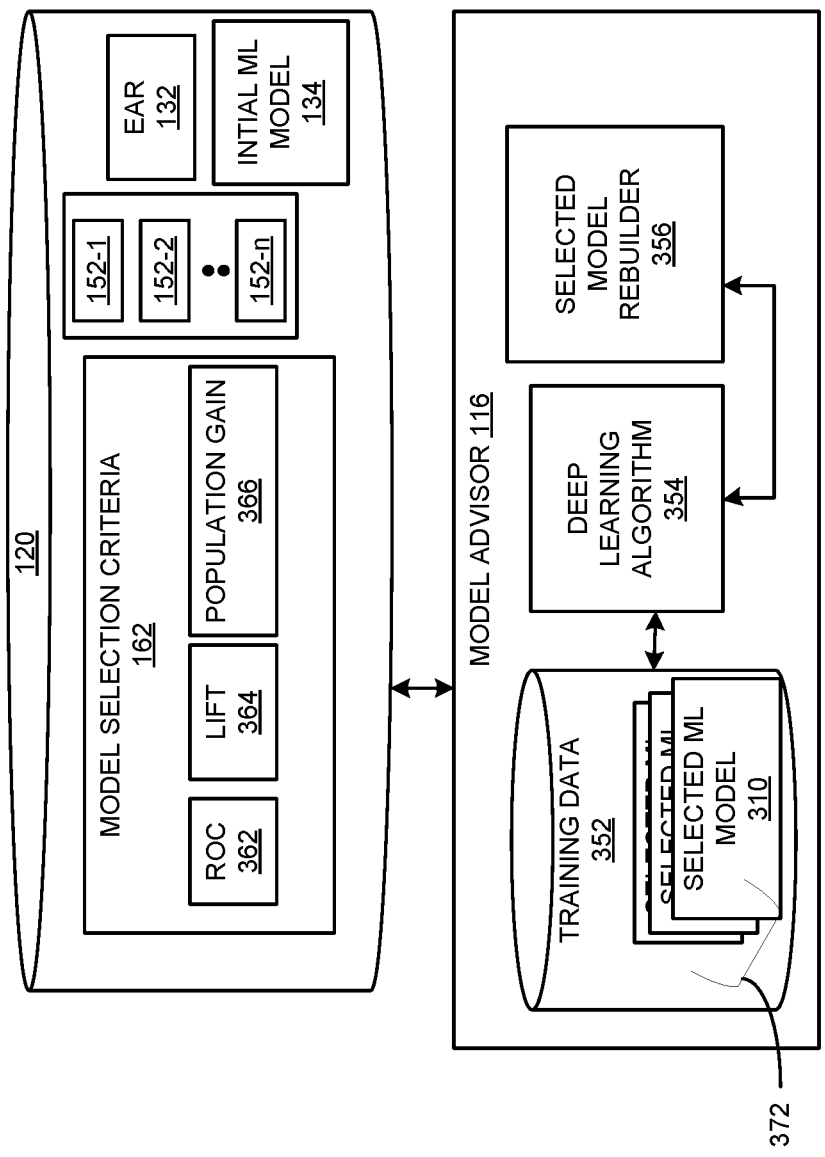
FIG. 3B shows a block diagram of a model advisor in accordance with examples disclosed herein.

FIG. 3B shows a block diagram of the model advisor 116 in accordance with examples disclosed herein. The model advisor 116 takes advantage of the knowledge that accumulates over time regarding the models 372 which are selected during the various model production cycles executed by the model builder 104 and the model selector 106. The model advisor 116 is therefore configured to make the monitoring procedures less processor-intensive by reducing the number of models to be re-built for a data cycle. The data associated with the parallel model building and the real-time model re-building processes such as the data from the condition detectors 154-1, . . . 154-*x*, the associated status predictions regarding the segments into which the entity 110 was categorized, the related propensity scores, the messages and alerts triggered by the status and the propensity scores, the models 372 that were selected under different circumstances and the effect of the solutions proposed in the messages/alerts on the entity 110 can be obtained via the feedback collector 118. The data thus obtained may be used as training data 352 that can be used to train a deep-learning algorithm 354 based AI element such as a deep learning algorithm 354 for selecting a model or a model building ML algorithm from the one or more possible models/algorithms. When the current data 112 is updated during a data cycle, the deep learning algorithm 354 employs the current data 112 to identify which of the ML algorithms may be used to build the best or the highest scoring model in terms of accuracy. The selected ML model rebuilder 356 thus rebuilds the selected ML model 310 using the ML algorithm determined by the deep learning algorithm 354 as producing the most accurate model.

Figure 4:
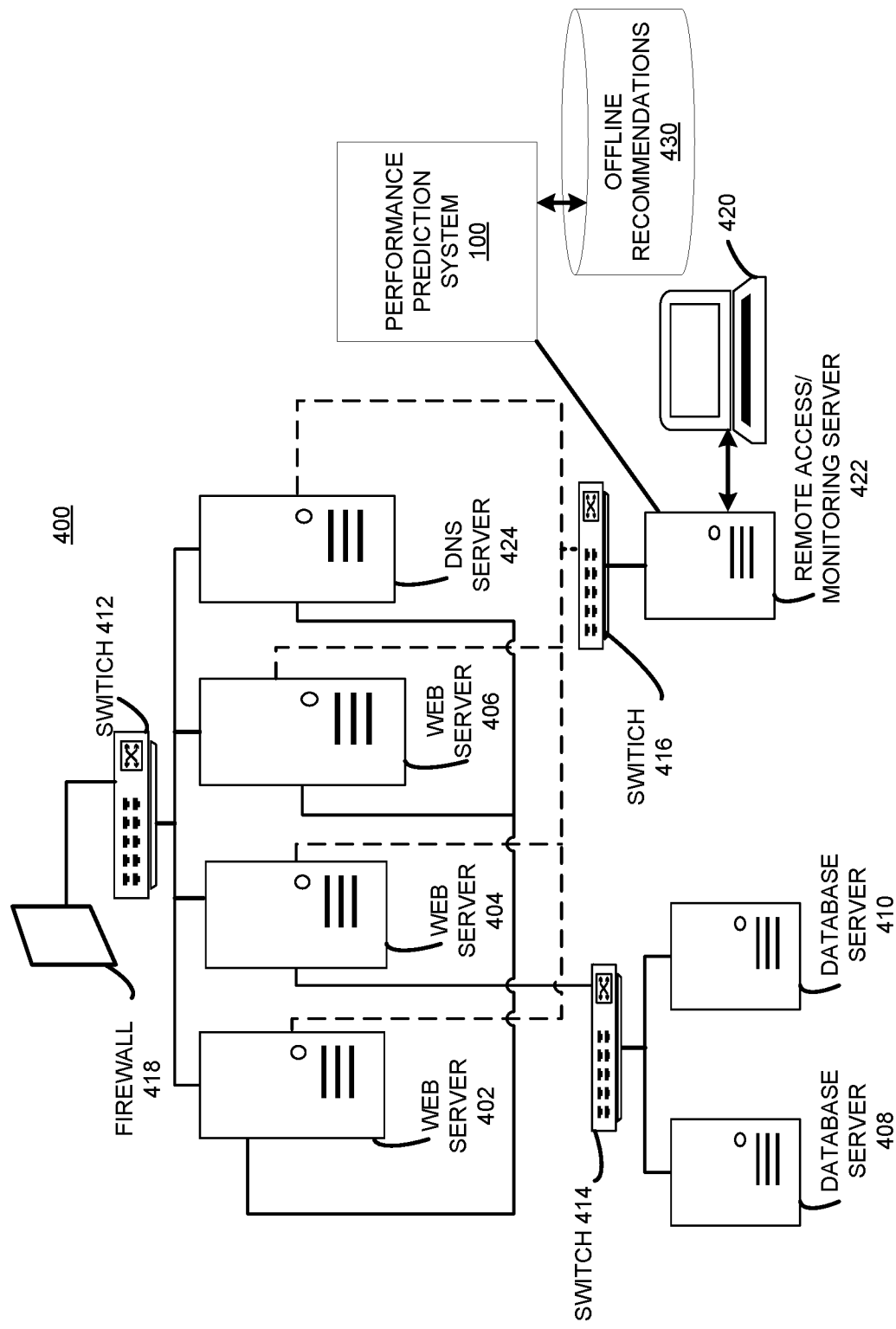
FIG. 4 shows an example entity which includes a server farm that can be monitored by the performance prediction system in accordance with examples disclosed herein.

FIG. 4 shows an example entity which includes a server farm 400 that can be monitored by the performance prediction system 100. It can be appreciated that the details of the server farm are discussed herein merely by the way of illustration and not limitation and that other entities including server farms with different components than those shown in FIG. 4 may also be monitored in accordance with examples disclosed herein. Generally, websites may be served with single PC or multiple number of webservers along with database servers, application servers and other types of servers based on the functionality offered by the website and the transaction volume of the website. Accordingly, the server farm 400 includes many types of servers including three web servers 402, 404 and 406, database servers 408, 410, a DNS server 424, switches 412, 414 and 416, and a computing system 420. An administrative/remote access monitoring server 422 on which the performance prediction system 100 may be executed is also included within the server farm 400. The computing system 420 may be communicatively coupled to the remote access/monitoring server 422 thereby allowing an administrative user to monitor the server farm 400 using the performance prediction system 100. The server farm 400 may be protected from the internet and other networks by a firewall 418 via the switch 412. The initial ML model 134 may be generated by the performance prediction system 100 from the historical data 122 associated with the server farm 400 including but not limited to, hardware and software configurations, operating system versions, past breakdowns, industries served and the like.

In an example, if the performance prediction system 100 is monitoring multiple server farms, the recommendations may be stored on a central server to be transmitted to the component server farms as needed. In this case, if connectivity problems occur on the server farm 400, having a centralized database of recommendations only causes a problem wherein the server farm 400 is unable to access the centralized recommendations. As a result, the performance prediction system 100 can fail to take corrective actions. Therefore, the performance prediction system 100 is configured to store local copies of the recommendations at each server farm it may be monitoring. Accordingly, if the performance prediction system 100 is monitoring a plurality of server farms then offline recommendations 430 can be maintained so that in case the server farm 400 faces connectivity problems, the offline recommendations 430 may be accessed in order to recover connectivity to the larger network.

Figure 5:
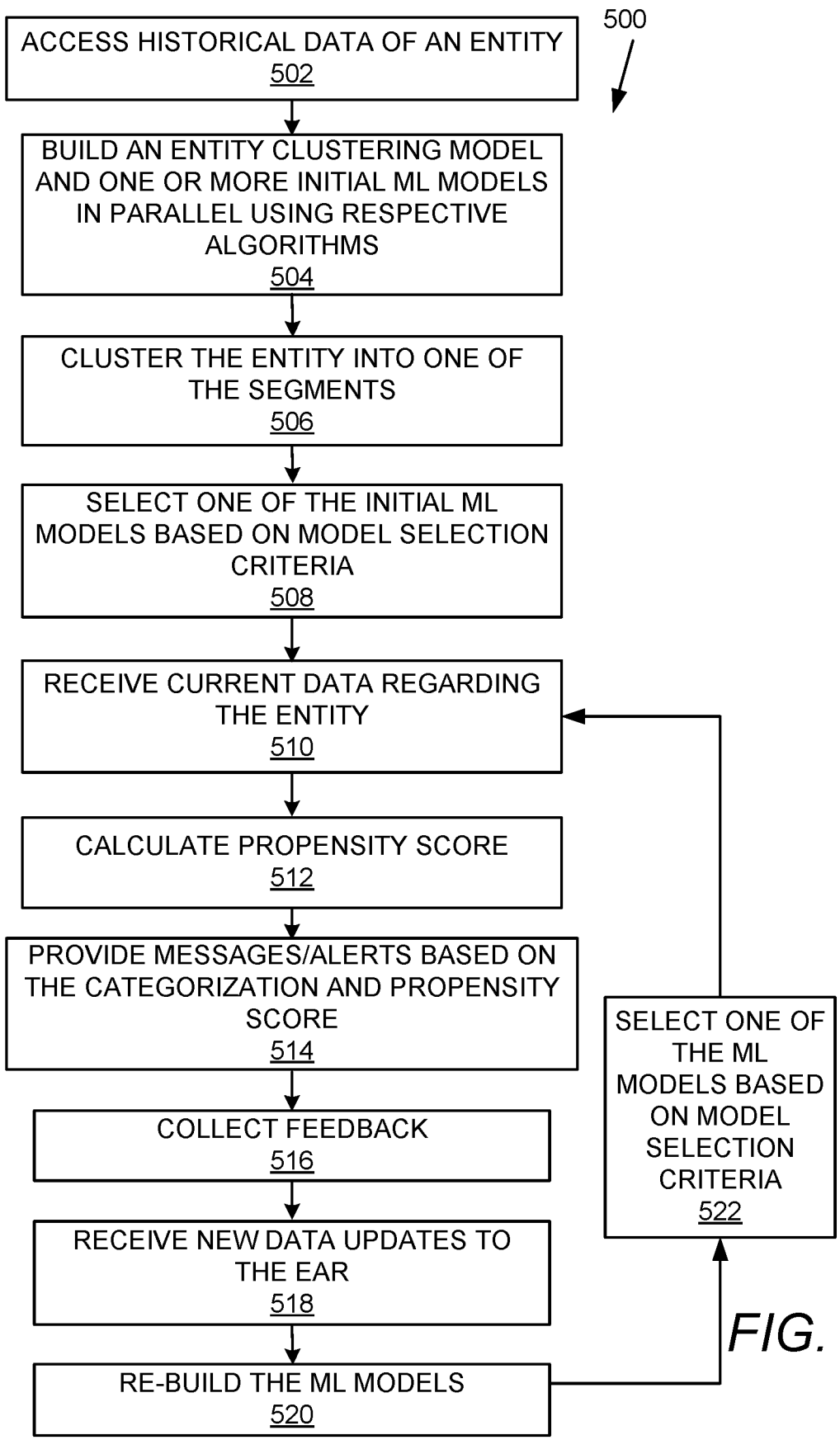
FIG. 5 shows a flowchart that details a method of monitoring an entity in accordance with examples disclosed herein.

FIG. 5 is a flowchart 500 that details a method of monitoring an entity in accordance with examples disclosed herein. The method begins at 502 wherein the historical data 122 associated with the entity 110 is accessed. Historical data 122 as described above includes attributes of the entity 110 such as component entities that may be present within the entity 110 and properties of the component entities, information regarding the functioning of the entity 110, the past breakdowns that occurred at the entity 110, the solutions that were implemented and success/failure of the solutions, other data such as demographic data, location data and the like. Due to the volume and the variety of data that may be included in the historical data 122, Big Data platforms can be used to host the historical data 122.

The entity clustering model 108 is initially built at 504 from the historical data using clustering algorithms such as but not limited to, k-means algorithm. Additionally, one or more initial ML models 152-1-1, 152-2-1 . . . 152-n-1 can be built simultaneously from the historical data 122 via parallel processing using different model building algorithms at 504. In an example, each of the initial ML models 152-1-1, 152-2-1 . . . 152-n-1 may be built from the historical data 122 using a respective ML model building algorithm such as random forests, gradient boosting, SVMs and the like. In fact, as newer ML algorithms are explored for model building, the performance prediction system 100 can be configured to support such algorithms to obtain more accurate results for entity monitoring. At 506, the entity 110 is clustered into one of the segments 156 or 158 using the entity clustering model 108. In an example, the entity clustering model 108 may cluster the entity 110 each time the current data 112 is refreshed. In an example, the entity clustering model 108 can cluster the entity 110 at predetermined time periods. At 508, one of the initial ML models 152-1-1, 152-2-1 . . . 152-n-1 is selected based on the model selection criteria 162. The initial ML models 152-1-1, 152-2-1 . . . 152-n-1 may be evaluated and compared using, for example, one or more of Eqs. (1), (2) and (3) in order to select a highest scoring initial ML model. The initial ML model 134 thus selected at 508 is used to evaluate the status of the entity 110 as outlined below.

At 510, data from the various condition detectors 154-1, 154-2 . . . 154-x is received at the performance prediction system 100 which is used by the data processor 102 to update the EAR 132. The EAR 132 is therefore updated with the current data 112 from the entity 110 at 510. Based on the data within the updated EAR, the selected initial ML model 134 calculates a propensity score which can be indicative of the likelihood of the entity 110 to move from the high value segment 156 to the low value segment 158 or vice versa is calculated at 512.

The propensity score estimation or a projection of a future status of the entity 110 can be achieved based on consideration of various factors that currently affect the functioning of the entity 110. For example, if a server in the server farm 400 is working under normal traffic conditions, segmentation or grouping may happen based on factors such as, but not limited to, usage, temperature, historical record of the server farm 400 facility in general, the domain or industry category the server is catering to, the current time of the day or year (which can determine the usage) and the like. A sudden spike in temperature observed in the current data 112 due to the failure of air conditioning (AC) in the server farm facility may effect a change in the status or categorization of the server farm entity. Thus, the different variables that affect each component entity (such as a server or a switch in the server farm 400) are identified, the variable values are collected from the current data 112 and aggregated to obtain the propensity score.

For each component entity, the probability that the component entity will migrate is given by P(Y), wherein, $$P(Y)=f_x(x_1, x_2 \ldots x_n)$$  Eq. (4)

where $x_i$=variable i defining the model prediction, Y=target variable indicating a likelihood that the component entity will migrate/not migrate.

It may be noted that in Eq. (4) may be further weighted by factors indicative of the importance of the component entity/variable in determining the status of the entity 110 as belonging to one of the high value segment 156 or the low value segment 158. While the above probability score is calculated with the current data 112, it may be noted that the probability of how a component entity affects the propensity of the entity to migrate from one segment to another or the factors/weightage to be assigned to the component entity may be learnt by the selected ML model 310 from historical data 122. The historical data 122 may include past breakdown history and the interactions between the various component entities that affected the migration propensity of a given component entity.

In another example, if the current data 112 indicates that a server experiences a jump in the network traffic, the CPU utilization of the server goes up. Based on the importance of the server within the server farm or group of server farms and the factor/weightage assigned to CPU utilization, the selected ML model 310 when applied to the current data 112 can predict the propensity of the entity 110 to migrate from a current segment into which it is classified into another segment.

At 514, the messages or alerts may be provided by the recommendation engine 114 based on the status of the entity 110 and the propensity score. At 516, the feedback which includes any changes affected at the entity 110 in response to the received messages/alerts is collected. The solutions suggested in the message/alerts, the information regarding whether the suggested solutions were implemented and if the implemented solutions provided the intended benefits are recorded at 516. The performance prediction system 100 is a self-learning machine wherein training occurs constantly and automatically via the feedback cycle. Therefore, the performance prediction system 100, can be configured to learn new solutions automatically via implicit training based on the success of the new solution.

At 518, a next data cycle commences wherein new data from the condition detectors 154-1, 154-2 . . . 154-x is received by the performance prediction system 100 and the EAR 132 is updated with the new data. For example, if the data cycle at 520 is the second data cycle, the various ML models 152-1-2, 152-2-2, . . . 152-n-2 are rebuilt at 520 based on the current data 112 obtained in the second data cycle and one of the models 152-1-2, 152-2-2 . . . 152-n-2 is selected at 522 based on the model selection criteria 162. In an example, a current ML model being used or the ML model employed in the first data cycle may also be compared with the rebuilt models in order to determine the ML model to be used in the second data cycle. The method returns to step 512 wherein the propensity score is estimated. Based on the propensity score the messages/alerts related to actions to be implemented at the entity 110 are sent out at 514, the feedback is collected at 516 and the performance prediction system 100 waits to receive updates to the current data in the next data cycle at 518. The performance prediction system 100 therefore constantly monitors the entity 110 while automatically learning from the monitoring procedures.

Figure 6:
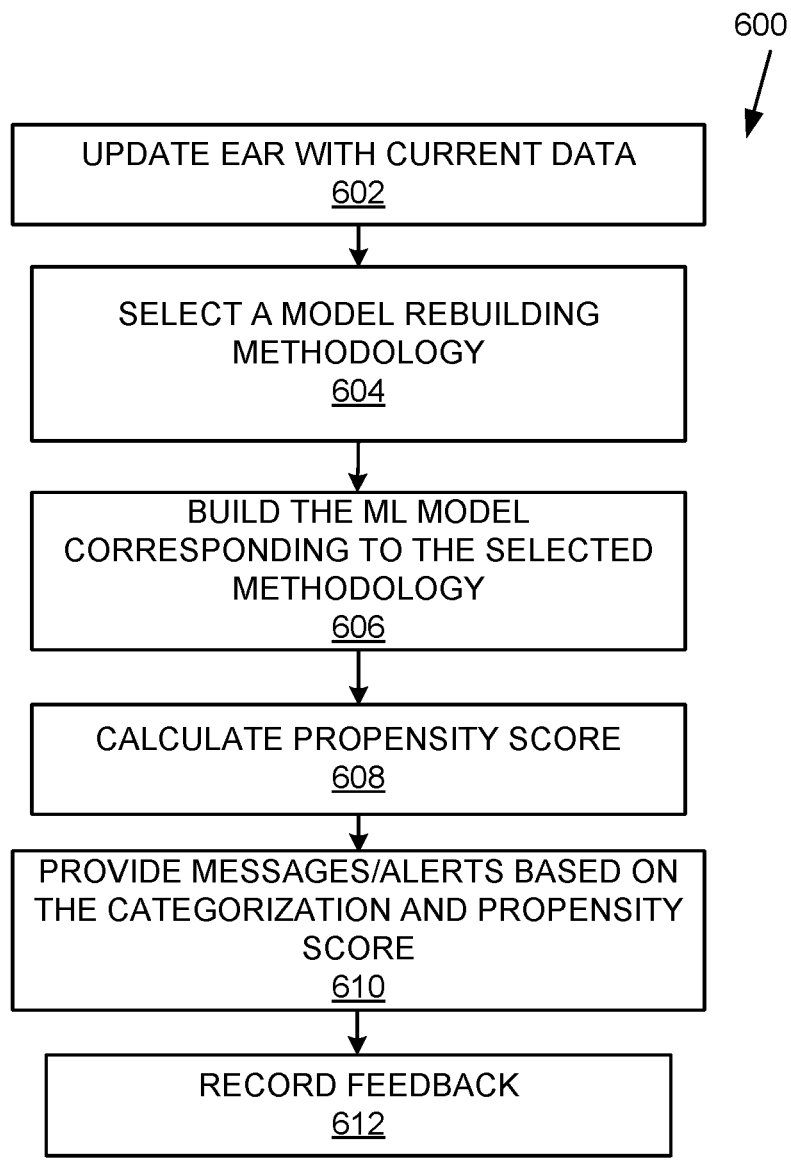
FIG. 6 shows a flowchart that details a method of monitoring the entity in accordance with examples disclosed herein.

FIG. 6 is a flowchart 600 that details a method of monitoring the entity 110 in accordance with examples disclosed herein. The method begins at 602 wherein a data cycle is initiated so that the EAR 132 is updated with the current data 112. With passage of time and greater usage, the performance prediction system 100 can be configured for automatic model selection and rebuilding. The automatic model selection using AI elements such as deep learning neural networks is enabled via the feedback collector 118 and the learning capacity of the model builder 104 and the model selector 106. Therefore, each time a data cycle is initiated via the updates to the current data 112 and the EAR 132, the algorithm for model rebuilding may be initially selected and the model associated with the selected algorithm is rebuilt. The automatic model selection and rebuild mechanism saves time and processing power while adding another layer of intelligence to the performance prediction system 100.

At 604, a model rebuilding methodology or an algorithm from the one or more ML algorithms 202-1 . . . 202-$n$ is selected for which the corresponding ML model is to be rebuilt based on the current data 112. The algorithm selection may be based on historical training procedures wherein the probability of success is estimated for each of the ML models based on respective recorded performances of the ML models during the entity performance prediction. Based on the information from the feedback collector 118, the ML models which worked best for particular sets of inputs from the condition detectors are learnt by a deep learning neural network which results in the deep learning algorithm 354 which is used for the ML model/algorithm selection. The deep learning algorithm 354 can identify a set of condition detector inputs similar to those received in the current data at 602 and the model that worked best for that set of condition detector inputs. Accordingly, the corresponding ML algorithm with a highest probability of success to address the current data 112 is selected at 604. The model associated with the selected algorithm is rebuilt at 606 based on the current data 112 or the updated EAR. The rebuilt model is used for calculating the propensity score at 608. Based on the entity categorization and the propensity score, the performance or status of the entity associated with the EAR can be predicted and various alerts and messages may be transmitted at 610 and the associated feedback is recorded at 612 for training purposes. Hence, an automatic model selection and rebuild mechanism may be implemented via supervised learning wherein the supervision comes from the historic data of prior model building and usage cycles.

Figure 7:
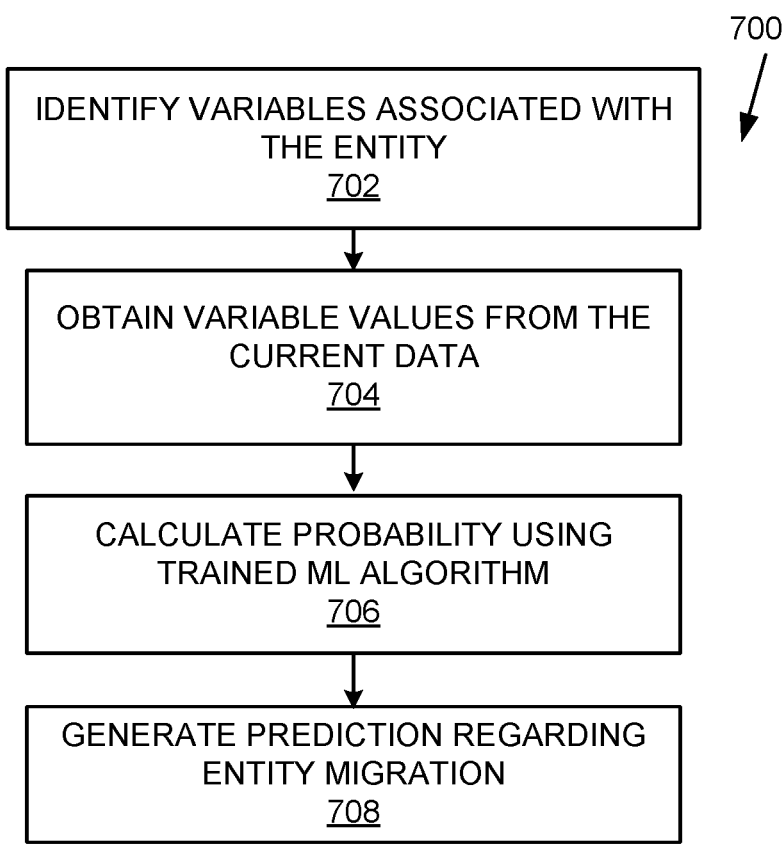
FIG. 7 shows a flowchart that details a method of determining the propensity of the entity by a selected machine learning (ML) model in accordance with examples disclosed herein.

FIG. 7 shows a flowchart 700 that details a method of determining the propensity of the entity 110 to migrate in accordance with examples disclosed herein. The method begins at 702 wherein variables that represent attributes associated with the entity 110 and interactions between the attributes such as those variables that may be calculated from different attributes can be identified. Based on the physical devices/objects that the entity 110 encompasses, the entity 110 can include component entities. If the entity 110 constitutes component entities, then the entity 110 variables may include the variables of the component entities. The values of the variables are obtained at 704 from the current data 112. Also, those variables whose values can be estimated from the current data 112 may also be obtained at 704.

A complex ML algorithm such as random forest, neural network, SVM and the like can be trained on the historical data 122 to calculate the propensity score at 706. Based on the propensity score, predictions regarding the entity migration from a currently categorized segment to the other segment can be obtained at 708. As described herein, entity migration from one segment to another segment may be affected by complex interactions between the various factors. For example, an increase in CPU usage of one or more servers in a server farm may not particularly affect the status of the server farm. However, an increased CPU usage when combined with increased temperature due to a cooling system failure may cause the server farm entity to have increased propensity to migrate from the high value segment 156 to the low value segment 158. The effect of the interactions of component entities and their variables on the status of the entity 110 as a whole is represented by Eq. (4). Therefore, the current status of the entity and the estimated propensity score affect the prediction regarding the likely migration of the entity 110.

Figure 8:
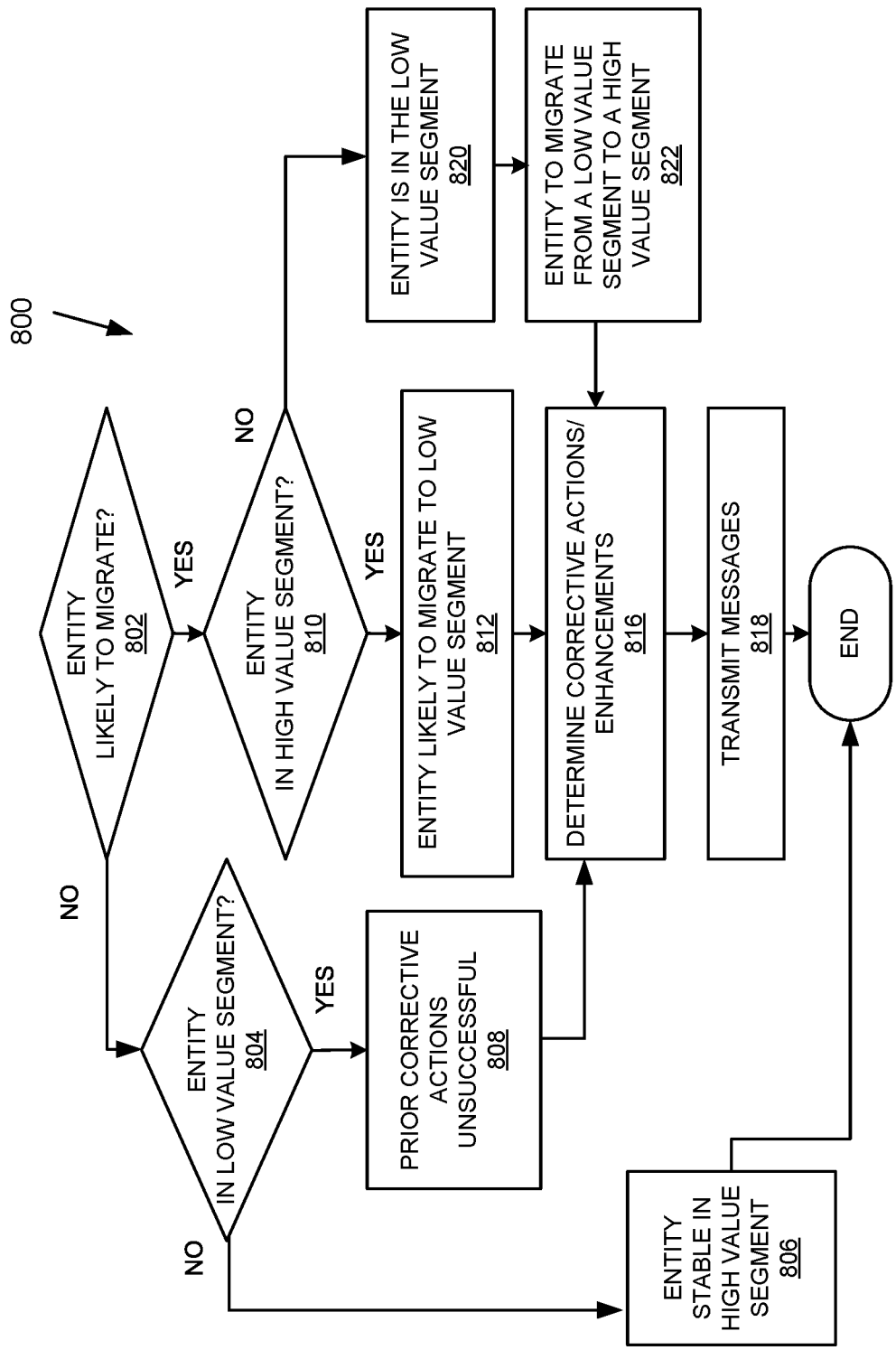
FIG. 8 shows a flowchart that details a method of monitoring the entity based on the migration of the entity from one segment to another in accordance with examples disclosed herein.

FIG. 8 shows a flowchart 800 that details a method of monitoring the entity 110 based on the migration of the entity 110 from one segment to the other in accordance with examples disclosed herein. Upon determining the current categorization of the entity 110 and calculating the propensity score, it is determined at 802 if the entity 110 is likely to migrate from the currently categorized segment. If it is determined at 802 that the entity 110 has low likelihood or low probability of migration, it is further determined at 804 if the entity 110 is currently categorized into the low value segment 158. If the entity 110 is not categorized into the low value segment 158, it is determined at 806 that the entity 110 is in the high value segment 156 with little or no propensity to migrate. Since the entity 110 is a stably grouped within the high value segment 156, no further action is required and the procedure terminates on the end block. If at 804, it is determined that the entity is currently categorized into the low value segment 158 with little or no propensity to migrate, it can be determined at 808 that either no corrective actions or system enhancements were implemented or that the actions which were implemented failed to improve the functioning of the entity 110. Hence, the method moves to identify the corrective actions and/or the system enhancements to improve the functioning of the entity 110 at 816. The messages or alerts with the actions are transmitted accordingly at 818.

If at 802, it is determined that the entity 110 may be likely to migrate from the current segment, it is further determined at 810 if the entity 110 is currently categorized into the high value segment 156. If it is determined at 810 that the entity 110 is in the high value segment 156, then it is determined at 812 that the entity will be migrating to the low value segment 158. Various actions can therefore be determined at 816 and messages or alerts with the determined actions can be transmitted at 818. Alternatively the determined actions can be directly implemented. The actions determined at 816 can be corrective actions and/or system enhancements. For example, if the temperature at a server is high then a cooling system to bring the temperature within the optimal performance range may be arranged. Similarly, if the transaction load on a server is increasing, another server may be arranged or the capacity of the current server may be increased to service the additional demand.

If at 810, it is determined that the entity is not currently categorized into the high value segment, it is determined at 820 that the entity 110 is categorized into the low value segment 158. It can be further determined at 822 that the entity 110 may migrate from the low value segment 158 to the high value segment 156. Accordingly, the system enhancements or corrective actions that can be implemented are identified at 816. The method then returns to 818 wherein the messages or alerts with the information regarding the requisite system enhancements to hasten the shift or migration of the entity 110 from the low value segment 158 to the high value segment 156 can be transmitted. Again, feedback regarding the implementation successes and failures of the corrective actions or suggested system enhancements may be recorded for further training and improving the performance prediction system 100.

Figure 9:
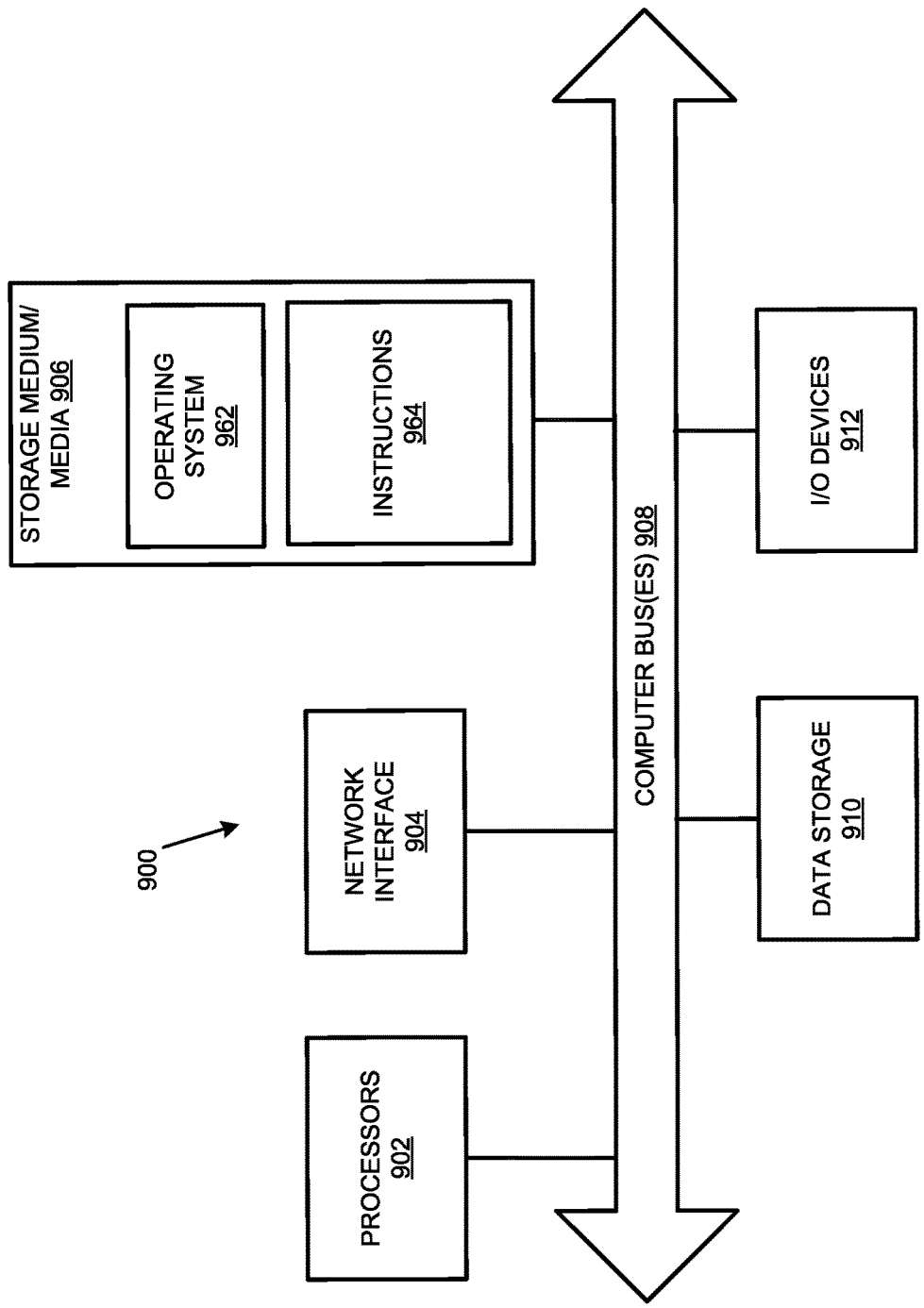
FIG. 9 illustrates a computer system that can be used to implement the performance prediction system in accordance with examples disclosed herein.

FIG. 9 illustrates a computer system 900 that may be used to implement the performance prediction system 100. More particularly, computing machines such as desktops, laptops, smartphones, tablets and wearables which may be used to generate or access the data from the performance prediction system 100 may have the structure of the computer system 900. The computer system 900 may include additional components not shown and that some of the components described may be removed and/or modified. In another example, a computer system 900 can sit on external-cloud platforms such as, Amazon Web Services, or internal corporate cloud computing clusters, or organizational computing resources, etc.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer-readable medium 906 may be any suitable medium which participates in providing instructions to the processor(s) 902 for execution. For example, the computer-readable medium 906 may be non-transitory or non-volatile medium, such as a magnetic disk or solid-state non-volatile memory or volatile medium such as RAM. The instructions or modules stored on the computer-readable medium 906 may include machine-readable instructions 964 executed by the processor(s) 902 to perform the methods and functions of the performance prediction system 100.

The performance prediction system 100 may be implemented as software stored on a non-transitory computer-readable medium and executed by the one or more processors 902. For example, the computer-readable medium 906 may store an operating system 962, such as MAC OS, MS WINDOWS, UNIX, or LINUX, and code 964 for the performance prediction system 100. The operating system 962 may be multi-user, multiprocessing, multitasking, multithreading, real-time and the like. For example, during runtime, the operating system 962 is running and the code for the performance prediction system 100 is executed by the processor(s) 902.

The computer system 900 may include a data storage 910, which may include non-volatile data storage. The data storage 910 stores any data used by the performance prediction system 100. The data storage 910 may be used to store the various models that are generated, the initial ML model 134, model selection criteria 162, the current data 112 obtained from the latest data cycle and the like.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) performance prediction system comprising:
at least one processor;
a non-transitory computer readable medium storing machine-readable instructions that cause the at least one processor to:
receive current data related to an entity at a specified time period;
rebuild a plurality of machine learning (ML) models with different model building methodologies in parallel using the current data received at the specified time period, each of the plurality of ML models estimating a respective propensity score for the entity to move from a categorized segment to another segment, wherein the entity can be categorized into one of a low value segment and a high value segment based at least on a breakdown frequency of the entity;
apply one or more model selection criteria to each of the plurality of models and a current ML model being used to estimate the propensity score;
select an ML model from the plurality of ML models and the current ML model based on the application of the model selection criteria;
determine via application of the selected ML model, a propensity score for the entity, the propensity score determining a likelihood of the entity to migrate from the categorized segment to another segment;
provide one or more of recommendations and alerts based on the propensity score obtained from the selected ML model, the recommendations and alerts are related to actions to be implemented that hasten migration of the entity from the low value segment to the high value segment when the categorized segment is the low value segment;
provide one or more of recommendations and alerts related to delaying actions based on the propensity score obtained from the selected ML model, wherein the delaying actions inhibit migration of the entity from the high value segment to the low value segment when the categorized segment is the high value segment;
collect feedback regarding the selected ML model, the feedback including response of the entity to the implemented actions; and
monitor performance of the entity by periodically repeating the steps of rebuilding, applying, selecting, determining, providing and recording for each time period at which respective current data related to the entity is received.

2. The performance prediction system of claim 1, wherein the respective current data for each time period is received from one or more data sources.

3. The performance prediction system of claim 1, wherein the instructions for collecting feedback regarding the selected ML model further comprising instructions that cause the processor to:
record successes or failures of the implemented actions.

4. The performance prediction system of claim 3, further comprising instructions that cause the processor to:
employ a trained neural network to estimate a probability of success of each of the plurality of ML models based on respective recorded performances of the plurality of ML models.

5. The performance prediction system of claim 3, further comprising instructions that cause the processor to:
alter the alerts or recommendations based on the recorded successes and failures.

6. The performance prediction system of claim 1, wherein the high value segment includes entities with low breakdown frequencies.

7. The performance prediction system of claim 1, wherein the value segment includes entities with high breakdown frequencies.

8. The performance prediction system of claim 1, further comprising instructions that cause the processor to:

build one or more initial ML models using the different model building methodologies from historical data associated with the entity; and select one of the one or more initial ML models as an initial ML model that provides the propensity score for the entity.

9. The performance prediction system of claim 1, wherein the entity includes one or more component entities.

10. The performance prediction system of claim 1, wherein the model selection criteria include one or more of receiver operating characteristics (ROC), lift and population gain.

11. The performance prediction system of claim 1, wherein instructions for selecting the ML model from the one or more ML models and the current ML model further comprise instructions that cause the processor to:

training a deep learning neural network on historical data of the entity for selecting the ML model from the plurality of ML models, wherein each of the plurality of ML models is associated with a respective ML model building methodology of the different model building methodologies.

12. A method of monitoring an entity comprising:

accessing historical data regarding a server farm gathered from one or more data sources;

selecting from a plurality of machine learning (ML) models built from the historical data using a respective model building methodology of different model building methodologies for generating corresponding propensity scores for the server farm, an initial (ML) model that estimates the corresponding propensity score for the server farm, the propensity score indicative of a likelihood of the server farm migrating from a categorized segment into another segment wherein the server farm can be categorized into one of a low value segment and a high value segment based at least on a breakdown frequency of the server farm;

transmitting one or more of messages and alerts based on the categorized segment and the propensity score;

updating an entity analytical record (EAR) associated with the server farm with current data pertaining to the server farm gathered at a defined time period from the data sources;

selecting, using a trained neural network, a model building methodology from the different model building methodologies associated with the plurality of ML models including a methodology associated with the initial model, to rebuild an ML model based on the current data gathered at the defined time period;

rebuilding the ML model based on the current data gathered at the defined time period using the selected ML model building methodology;

categorizing the server farm into one of the high value segment or the low value segment based on the EAR;

re-estimating, by the rebuilt ML model, the propensity score for the server farm;

transmitting one or more of hastening messages and alerts based on the categorized segment and the propensity score as determined by the rebuilt ML model, wherein the hastening recommendations and alerts hasten migration of the server farm from the low value segment to the high value segment when the server farm is categorized into the low value segment; and transmitting one or more of delaying messages and alerts based on the categorized segment and the propensity score as determined by the rebuilt ML model, wherein the delaying actions inhibit migration of the server farm from the high value segment to the low value segment when the categorized segment is the high value segment.

13. The method of claim 12, further comprising:

monitoring performance of the server farm via repeating the steps of updating, selecting, rebuilding, categorizing, re-estimating and transmitting.

14. The method of claim 12, further comprising:

storing the hastening messages and alerts and the delaying messages and alerts provided by the initial ML model and the rebuilt model locally with the server farm.

15. A non-transitory computer-readable storage medium comprising machine-readable instructions that cause a processor to:

receive current data related to an entity at a specified time period;

apply one or more model selection criteria to each of a plurality of machine learning (ML) models based on respective model building methodologies, wherein each of the plurality ML models estimates a respective propensity score for the entity to move from a categorized segment to another segment, wherein the entity can be categorized into one of a low value segment and a high value segment based at least on a breakdown frequency of the entity;

select an ML model from the plurality of ML models based on the application of the model selection criteria;

rebuild the selected ML model using the current data received at the specified time period, the selected ML model estimating a respective propensity score of the entity based on the current data;

provide one or more of recommendations and alerts related to actions to be implemented on the entity based at least on the categorized segment and the propensity score obtained from the selected ML model, wherein the recommendations and alerts are related to actions to be implemented that hasten migration of the entity from the low value segment to the high value segment when the categorized segment is the low value segment;

provide one or more of recommendations and alerts related to delaying actions based on the propensity score obtained from the selected ML model, wherein the delaying actions when implemented inhibit migration of the entity from the high value segment to the low value segment when the categorized segment is the high value segment;

collect feedback regarding the selected model based on response of the entity to the implemented actions; and monitor performance of the entity by periodically repeating the steps of rebuilding, providing and recording for each time period at which respective current data related to the entity is received.

16. The non-transitory computer readable storage medium of claim 15, wherein the plurality of ML models include ML models built based on one or more of random forests, boosted trees and support vector machines (SVMs).

17. The non-transitory computer readable storage medium of claim 15, wherein the instructions to receive current data related to the entity further comprise instructions that cause the processor to:

receive the current data related to the entity from one or more condition detectors that include Internet of Things (LOT) sensors that sense conditions at the entity.

* * * * *

UNITED STATES PATENT AND TRADEMARK OFFICE
CERTIFICATE OF CORRECTION

PATENT NO. : 11,514,354 B2  
APPLICATION NO. : 15/997180  
DATED : November 29, 2022  
INVENTOR(S) : Mamta Aggarwal Rajnayak et al.

Page 1 of 1

It is certified that error appears in the above-identified patent and that said Letters Patent is hereby corrected as shown below:

In the Claims

At Claim 1, Column 18, Line 12 from the top, the phrase "plurality of models" should instead read "plurality of ML models".

At Claim 7, Column 18, Line 4 from the bottom, the phrase "the value segment" should instead read "the low value segment".

At Claim 15, Column 20, Line 21 from the top, the phrase "the plurality ML models" should instead read "the plurality of ML models".

At Claim 15, Column 30, Line 48 from the top, the phrase "selected model based" should instead read "selected ML model based".

At Claim 17, Column 30, Lines 1 and 2 from the bottom, the phrase "Internet of Things (LOT)" should instead read "Internet of Things (IOT)".

Signed and Sealed this  
Fifteenth Day of August, 2023

Katherine Kelly Vidal  
*Director of the United States Patent and Trademark Office*